United States Patent [19]

Daniels, Jr.

[11] 4,100,239
[45] Jul. 11, 1978

[54] METHOD FOR MAKING HOLLOW PANELS

[76] Inventor: Lonnie E. Daniels, Jr., 1014 W. 18th St., Houston, Tex. 77008

[21] Appl. No.: 799,261

[22] Filed: May 23, 1977

[51] Int. Cl.² .................. B29D 23/03; B29D 23/04; B29G 2/00

[52] U.S. Cl. .................................. 264/102; 264/150; 264/151; 264/157; 264/159; 264/209; 264/210 R; 264/294

[58] Field of Search .................. 264/90, 150, 151, 159, 264/173, 209, 92, 148, 138, 157, 210 R, 320, 102, 294

[56] References Cited

U.S. PATENT DOCUMENTS

| | | | |
|---|---|---|---|
| 1,649,734 | 11/1927 | Roberts et al. | 264/90 |
| 3,663,672 | 5/1972 | Button et al. | 264/150 |
| 3,814,783 | 6/1974 | Dardaine et al. | 264/89 |
| 3,900,999 | 8/1975 | Callan | 264/176 R |

OTHER PUBLICATIONS

Dorian, Six-Language Dictionary of Plastics . . . , Iliffe Books, London (1966), pp. 174 & 175 relied on.

*Primary Examiner*—Willard E. Hoag
*Attorney, Agent, or Firm*—Pravel, Wilson & Gambrell

[57] ABSTRACT

Method for making hollow plastics insulating wall panel. The plastic material, in a flowable form, is continuously forced about a core to form an enclosed central cavity or chamber. The continuous plastic material is then severed and cavity sealed in a vacuum environment before final curing of the resulting hollow insulation product.

4 Claims, 5 Drawing Figures

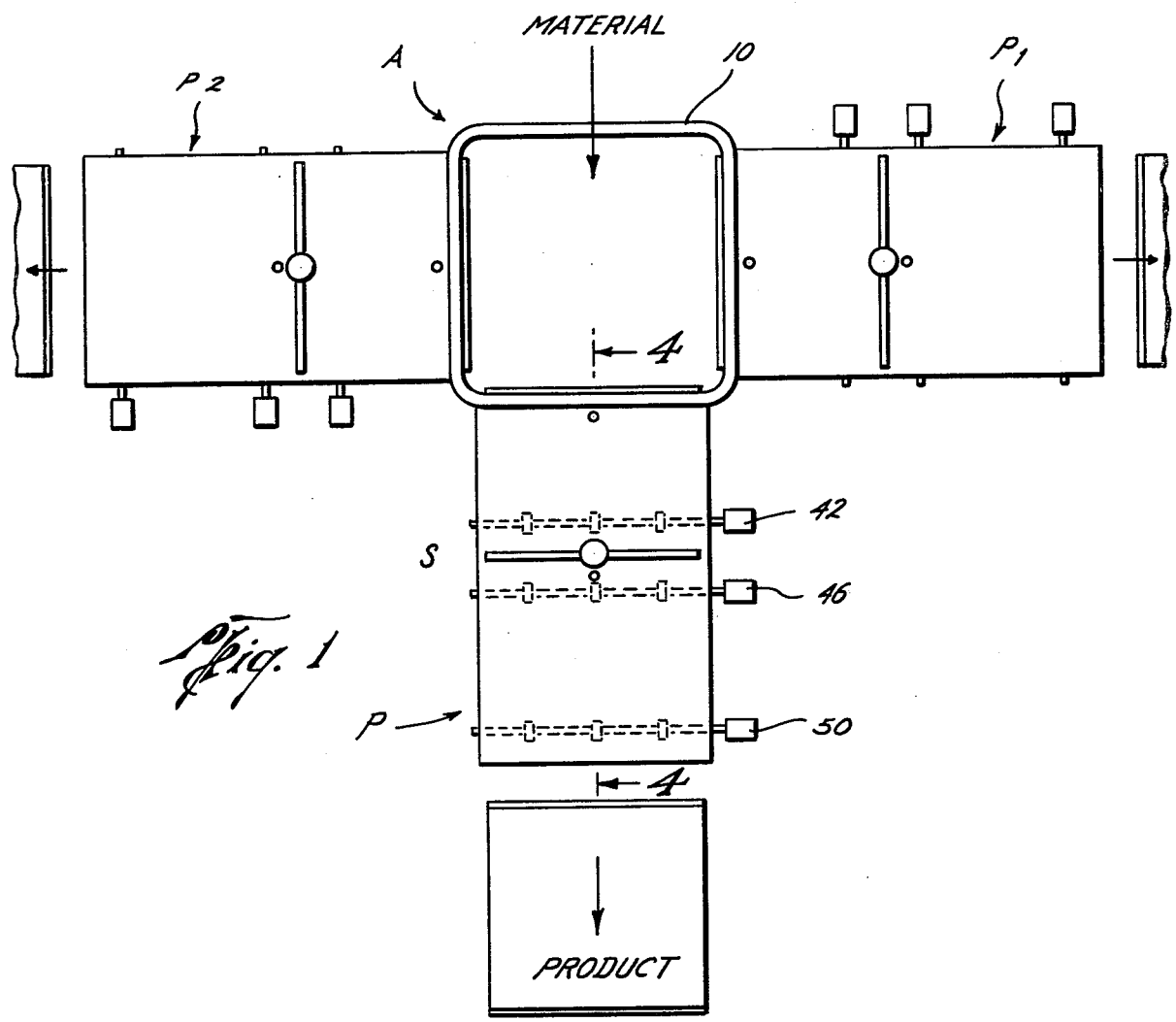

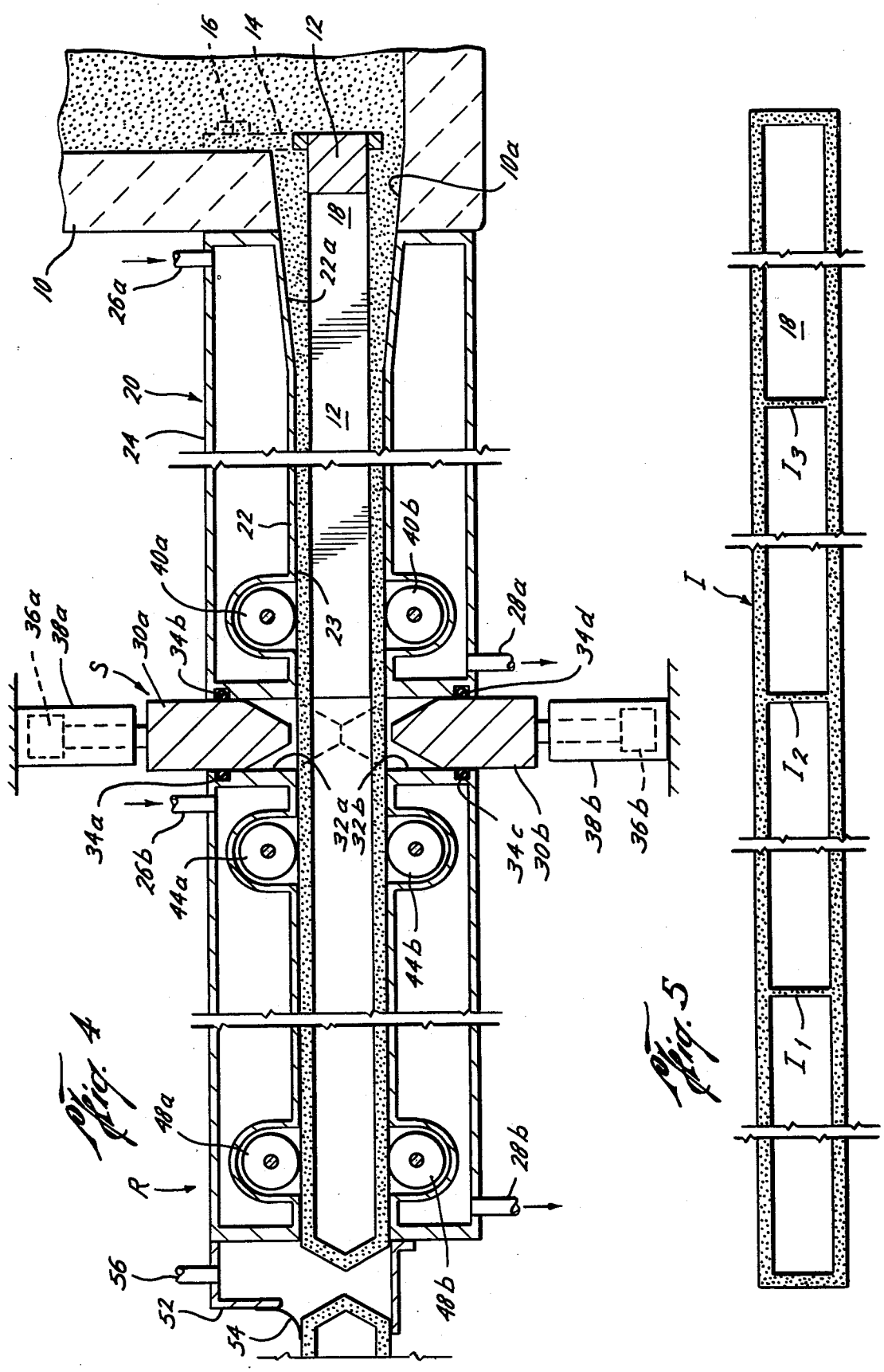

METHOD FOR MAKING HOLLOW PANELS

BACKGROUND OF THE INVENTION

This invention relates to the field of manufacturing of hollow insulation products.

Insulation products are well known as well as their desirable characteristics. Examples of dual wall units of such insulation products are disclosed in U.S. Pat. Nos. 3,646,721 and 3,834,096. As disclosed therein the cavity between the spaced and sealed panels may be evacuated or filled with a dry gas.

Laminating of glass panes is also known. See U.S. Pat. No. 3,852,136 where such a process is carried out under pressure. Frequently, spaced and sealed desirable pane window insulation units are used. The cavity between panes may be filled with a dry atmosphere or evacuated as described in U.S. Pat. Nos. 3,940,898 and 3,990,201, respectively. Other insulating panels, such as disclosed in U.S. Pat. No. 3,245,195 have filled the cavity with certain porous filler materials for increased strength.

Formation of double-walled plastic articles is also known. In U.S. Pat. No. 3,405,019 a vacuum bonding process is disclosed while in U.S. Pat. No. 3,580,762 the spaced panels are joined by spin welding of the product. In production line fabrication of hollow plastic articles it has been the practice to have a heating station adjacent a forming station, but not to continuously form the hollow plastic article as it moves. Examples of such work station production lines are disclosed in U.S. Pat. Nos. 3,462,330 and 3,783,078.

A continuous method of sealing a laminated panel is disclosed in U.S. Pat. No. 3,249,659, but the resulting cavity is not formed under vacuum conditions.

SUMMARY OF THE INVENTION

This invention relates to a new and improved insulation product and method of making the same.

A continuous hollow plastic material is formed by forcing the plastic material about a core to form a central cavity. The continuously formed hollow plastic material is then severed and cavity sealed in a vacuum environment prior to final curing of the plastic material to produce a homogenous insulation product of a desired shape having a hollow central cavity at a vacuum pressure condition.

An object of the present invention is to provide a new and improved insulation product.

A further object of the present invention is to provide a new and improved method of making an insulation product.

BRIEF DESCRIPTION OF THE DRAWINGS

FIG. 1 is a top view illustrating schematically the apparatus for performing the method of the present invention;

FIG. 2 is an isometric view of the molding core of the apparatus of FIG. 1;

FIG. 3 is an isometric view of the severing and sealing blade of the apparatus of FIG. 1;

FIG. 4 is a view taken along line 4—4 of FIG. 1; and

FIG. 5 is an end view, in section, of an insulation panel formed according to the method of the present invention.

DESCRIPTION OF THE PREFERRED EMBODIMENT

The apparatus A for performing the method of the present invention is schematically illustrated in FIG. 1. The apparatus A includes a central receiver 10 which may also serve as the container vessel or work station for processing the plastic material into the flowable form. It is to be understood however, that the receiver 10 may also be connected to or placed in communication with another apparatus (not illustrated), such as an extruder for supplying the plastic material in a flowable form to the reciever 10. While a heating extruder would be desirable for use with a thermoplastic material, mixing tanks would perhaps be more desirable and suitable for use with a thermosetting plastic material. The apparatus A of the present invention is equally well suited for forming the insulation product I of the present invention from either of these two generic types of plastic material.

FIG. 4 illustrates in greater detail one of the plurality processing flow paths, generally designated P, of the present invention extending from the receiver 10. As illustrated in FIG. 1, a plurality of such additional flow paths, designated P1 and P2, may extend from the receiver 10 in a manner similar to flow path P. Each of the processing flow paths leading from the receiver 10 may be employed to form insulation products according to the present invention and they may be used to form the insulation product of different predetermined sizes. Each of the plurality of processing flow paths operate in substantially the same manner and only the processing flow path P will be disclosed in detail for an enabling understanding of the present invention.

As illustrated in detail in FIG. 4, the processing flow line P commences with an outlet opening 10a formed in the receiver 10. The predetermined shape and size of the outlet opening 10a substantially controls the outer configuration and dimensions of the insulation product of the present invention as is well known in the art. Preferably, a rectangular shape is preferred for forming an insulation product as Panel I or rectangular outer dimensions as illustrated in section in FIG. 5.

Disposed in the opening 10a is a core member 12 that is centrally disposed in the opening 10a by support 14 that is secured to the receiver by suitable means such as bolt 16. The core 12 forms a continuous central cavity in the plastic material as it flows past the core 12. The opening 10a is provided with a decreasing taper downstream of the core 12 to ensure that the flowable plastic material will flow back together past the core support and prior to leaving the core 12 provide the enclosed continuous central cavity 18. If a thermoplastic resin product is being formed it may be advantageous to provide sufficient cooling to the core 12 by circulation of coolant through the core 12 to maintain the dimension of the product downstream of the core 12. If, on the other hand, a thermosetting resin is being formed, the core 12 may be heated sufficiently by circulated heating fluid therethrough to accelerate curing of the portion of the plastic surface adjacent the core 12 to ensure dimensions. Core dimensions may also be lengthened from that illustrated to ensure dimension stability.

Disposed adjacent the outlet opening 10a is a further curing portion or section generally designated 20. The curing portion 20 has a central opening 23 formed by enclosed inner well 22 which is aligned with and conforming substantially to the dimensions of the outlet opening 10a and preferably having a tapered inlet portion 22a to assure continued sealing flow of the plastic material in the peripherial portion downstream of the support 14 of the core 12. The core 12 may be formed with slots 12a, 12b and 12c extending along the tapered flow path of the core 12 to form the support ribs I1, I2 and I3 of the insulation Panel I as illustrated in FIG. 5. With such support ribs a plurality of enclosed chambers are formed.

The curing portion 20 apparatus A includes an enclosed outer jacket 24 for maintaining the circulated curing fluid adjacent the inner wall 22 forming the central opening 23 of the curing apparatus. As mentioned previously the curing fluid may be either a coolant or a heating fluid depending on the type of plastic used. The curing fluid is introduced into the surrounding jacket formed by the wall 24 at 26a and 26b and exists from the jacket at 28a and 28b, respectively.

Disposed in the curing section 20 a sufficient distance from the core 12 to enable sufficient partial curing of the plastic material to ensure maintenance of outer dimensions is a severing and sealing apparatus generally designated S. The severing and sealing apparatus includes a pair of reciprocating rams 30a and 30b that are received in openings 32a and 32b of the curing apparatus 20. Suitable seals 34a, 34b, 34c and 34d are provided for effecting a seal between the end walls defining the curing chambers for a purpose to be described more fully hereinafter. The rams 30a and 30b are reciprocated in the usual manner by double acting hydraulic pistons 36a and 36b received in the operating cylinders 38a and 38b, respectively.

As illustrated in FIG. 3, the rams 30a and 30b extend substantially across the flow path P for severing the continuously formed plastic material and bringing the end flaps together in a partially cured state where they will effectively seal for providing enclosed panels. To this end the curing fluid may also be circulated in the rams 30a and 30b for maintaining a desired curing temperature level.

As illustrated in FIG. 4, a plurality of powered roller supports, generally designated R, may be provided in the processing path P for moving the partially and fully cured insulation product through the curing portion 20. Preferably, upper and lower rollers 40a and 40b are disposed above and below the continuously formed product immediately upstream of the severing apparatus A and which are driven by the motor 42. Another pair of rollers 44a and 44b are provided immediately downstream of the severing blades 30a and 30b and which are powered or driven by the motor 46. Additional rollers 48a and 48b driven by motor 50 may be employed to move the completely cured hollow insulation panel from the curing apparatus 20.

After passing through the rollers 48a the insulation panel moves through a sealing chamber 52 having a flexible sealing member 54 which maintains a hermatic seal with the moving insulation panels I from the curing portion 20. The chamber 52 is connected through conduit 56 with the means providing a vacuum and which in conjunction with the ram seals 34a, 34b, 34c and 34d ensure that the insulation panel I is formed under vacuum conditions as well as severing and sealing the end panels. The vacuum conditions within the fnal enclosed cavity 18 of the insulation panel I aid in its effectiveness as an insulation product. Furthermore, it is not necessary to evacuate the air from each panel as the continuous central cavity 18 formed by the core 12 is maintained under vacuum condition in the curing, severing and sealing operations.

USE AND OPERATION

In the use and operation of the present invention, the apparatus A is assembled in the manner indicated. The circulation of curing fluid through the jacket 24 is established. Also, if curing fluid is to be circulated through the core 12 and the rams 30a and 30b such circulation is also established to bring the curing section or portion 20 to the desired temperature. Vacuum conditions are created in the vacuum chamber 54 by commencing the operation of the vacuum pump in the usual manner.

The plastic is then processed or prepared into flowable form and flows into the receiver 10 where it exists through the opening 10a about the core 12 in the previously explained manner. As the plastic material moves past the core 12 sufficient curing occurs in passing through the tapered section 10a and 22a to distribute the flowable plastic material sufficiently to provide the continuous central cavity 18. The curing of the outer edge of the flowable plastic material adjacent the wall 22 is sufficient to ensure the plastic material retains the dimensions of the passageway formed by the inner wall 22. Sufficient curing has occurred adjacent the rollers 40a and 40b on the outer surface to enable their assistance in moving the continuously cast insulation product to the rams 30a and 30b. The bulk of the wall thickness of the insulation product material is, however, still at a flowable state at the rams 30a and 30b and upon reciprocation of the rams to the position illustrated in phantom the continuously cast insulation product is severed and the ends are sealed under vacuum conditions. The rollers 44a and 44b assist in moving the severed and sealed insulation products away from the rams 30a and 30b and enable further curing of the insulation product to impart sufficient rigidity to enable the product to withstand the atmospheric pressure urging collapse of the insulation product on the substantially evacuated or vacuum conditions existing in the hollow cavity 18 of each of the insulation products I. When sufficient curing has occurred to impart this sufficient mechanical strength the rollers 48a and 48b will move the product out of the vacuum chambers 52 where it will then be available for processing.

FIG. 5 is a cross-sectional view of an insulation product formed according to the present invention which is provided with a plurality of internal ribs formed by the core illustrated in FIG. 2. With such an arrangement Panels I of substantial width may be fabricated that also have the capability to withstand atmospheric pressure along with sufficient self-rigidity and strength.

The foregoing disclosure and description of the invention are illustrative and explanatory thereof, and various changes in the size, shape and materials as well as in the details of the illustrated construction may be made without departing from the spirit of the invention.

I claim:

1. A process for continuously molding a hollow insulation product from plastic material having the resulting central cavity at a vacuum pressure condition including the steps of:

processing the plastic material into a flowable form;
placing the flowable plastic material continuously about a core to form an enclosed continuous central cavity in the plastic material while forming the outer predetermined dimensions of the insulation product;

hardening and cooling the plastic material sufficiently to maintain the outer predetermined dimensions;

forming a vacuum about the plastic material to maintain the area adjacent the outer predetermined dimension below atmospheric pressure;

severing the continuous plastic material periodically to form end closures for the severed plastic material;

sealing the central cavity of the severed plastic material with the end flaps to form the hollow insulation product with the sealed central cavity having a pressure therein below atmospheric pressure;

hardening and cooling the sealed hollow insulation product to retain the predetermined shape;

moving the sealed hollow insulation product out of the vacuum.

2. The method as set forth in claim 1, wherein the step of forcing includes:

extruding the flowable form plastic material.

3. The method as set forth in claim 1 including the step of:

forcing the flowable plastic material to continuously flow in a desired manner and a predetermined shape prior to the step of flowing.

4. The method as set forth in claim 3, where the step of flowing, includes:

reducing the size of the predetermined shape after flowing about the core to generate formation of the enclosed continuous central chamber.

* * * * *